(No Model.)
W. L. JOHNSON.
BACK BAND.
No. 444,296. Patented Jan. 6, 1891.
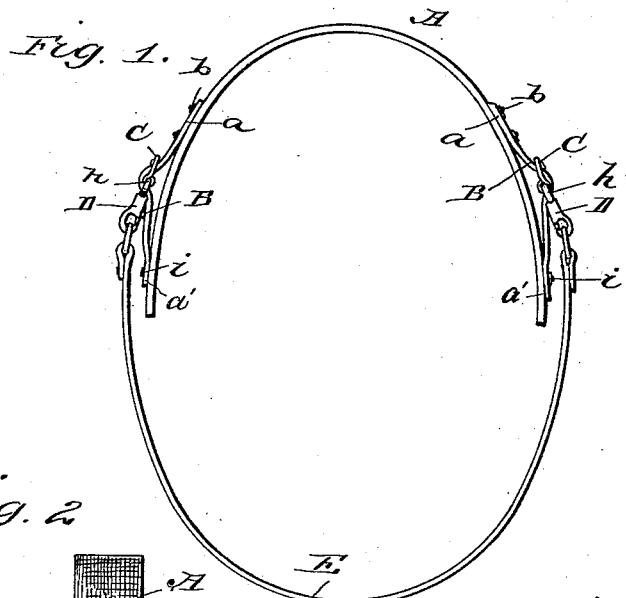
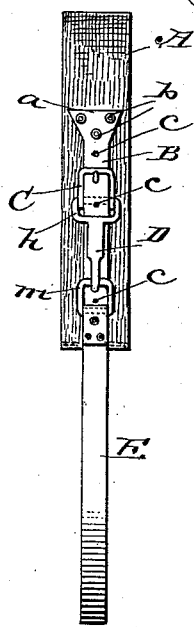
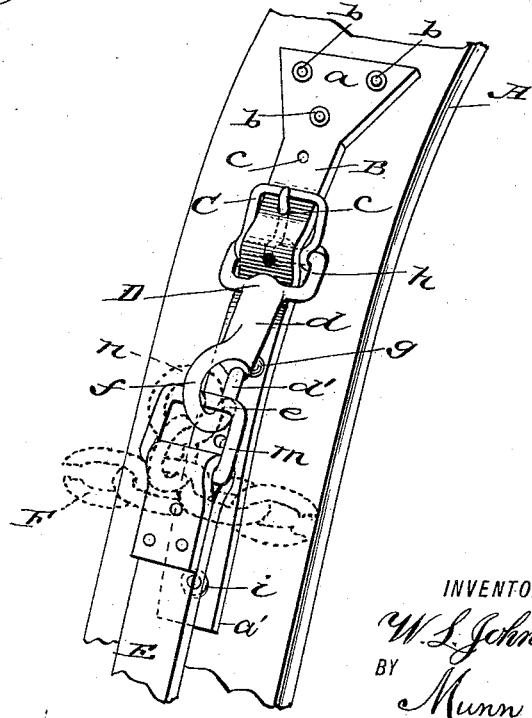
WITNESSES:
W. R. Davis.
E. M. Clark
INVENTOR:
W. L. Johnson
BY
Munn & Co.
ATTORNEYS

UNITED STATES PATENT OFFICE.

WILLIE L. JOHNSON, OF LAKE CITY, MISSISSIPPI.

BACK-BAND.

SPECIFICATION forming part of Letters Patent No. 444,296, dated January 6, 1891.

Application filed July 26, 1890. Serial No. 360,029. (No model.)

*To all whom it may concern:*

Be it known that I, WILLIE L. JOHNSON, of Lake City, in the county of Yazoo and State of Mississippi, have invented a new and useful Improvement in Back-Bands for Plow-Harness, of which the following is a full, clear, and exact description.

This invention relates to improvements in back-bands for plow-harness, and has for its object to provide a cheap, simple, and efficient device which will afford means for the support of trace-chains, so as to prevent the latter from dropping upon the ground and engaging the feet of the horse or other draft-animal that is hitched to a plow or cultivator.

To these ends my invention consists in the construction and combination of parts, as herein described and claimed.

Reference is to be had to the accompanying drawings, forming a part of this specification, in which similar letters of reference indicate corresponding parts in all the figures.

Figure 1 is an edge view of the device complete, a belly-band being shown attached to the back-band. Fig. 2 is a side view of the improved back-band with a belly-band removably secured to it; and Fig. 3 is an enlarged broken view of the back-band and a portion of a belly-band removably connected to a hook on the back-band, a trace-chain being also shown in dotted lines as connected to the same snap-hook.

The back-band A is preferably made of coarse strong webbing or folded canvas, which from its porous nature will afford free ventilation and avoid scalding of the animal's back or injurious chafing of the same. Considerable width should be given to the back-band, so as to distribute the pressure resulting from draft on the traces over proper area on the back of the animal.

Upon the outer surface of the back-band A, at equal distances from the ends of said back-band, two trace-carrying straps B are attached by their ends $a$ $a'$. The upper ends $a$ of the straps B are widened, as shown, to afford room for the insertion of three rivets $b$ in each end, which pass through the back-band and trace-carrying straps, and with suitable washers serve to hold these pieces firmly connected at a proper distance from the longitudinal center of the back-band and an equal distance from the parallel edges of said band. A proper length is given to the trace-carrying straps B, and a series of spaced perforations $c$ are formed in each of these straps for the engagement therewith of tongues on the buckles C.

A spring snap-hook D is combined with each buckle C, which parts are constructed as follows: The body $d$ of each of the similar snap-hooks D is made cylindrical and adapted to receive a sliding plunger $d'$, which is forced outwardly by a spiral spring within the cylindrical body $d$, (not shown,) said plunger having its outer end in contact with the nose $e$ of a hook $f$, which is formed on the body $d$, the plunger $d'$ being longitudinally moved by the buttons shown at $g$ in Fig. 3. Upon the opposite ends of the snap-hook bodies $d$ integral laterally-elongated loops $h$ are formed, with which the frames and tongues of the buckles C are loosely connected, as shown in Fig. 3.

The buckles C when engaged by the trace-carrying straps B may be adjusted to have their tongues enter any of the holes $c$ in said straps, so as to elevate or lower the snap-hooks D, and when the combined buckles and snap-hooks have been located on the straps B the lower ends of the latter should each be attached to the back-band A by a rivet and washer, as at $i$ in Fig. 3.

The belly-band E is made of any suitable material having a proper length and width, and is provided with connecting-rings $m$, that may engage the hooked portions $f$ of the snap-hooks D when the harness is adjusted upon an animal for service.

The trace-chains F, a portion of one being shown by dotted lines in Fig. 3, are of the usual form, and may be hooked fast by links or rings of the chains to the snap-hooks D, as at $n$ in Fig. 3.

When the draft-animal is reliable and well broken for service, the belly-band E is dispensed with, and the trace-chains F are alone attached to the snap-hooks D, the back-band A in either case serving to sustain the chains F in place and prevent their dragging on the ground when draft-strain is slackened or the direction of the plow changed.

By the provision of the combined buckles and snap-hooks and their movable connection with the back-band and traces the height of the traces may be quickly adjusted and the draft from the collar to the plow so regulated as to increase or diminish the depth of the furrow cut by the plow, which is an important feature in plow-harness.

Having thus described my invention, I claim as new and desire to secure by Letters Patent—

The herein-described back-band, consisting of the band or strip A, provided with the perforated straps B, secured at both of their ends to the band A, the snap-hooks D, provided with the buckles C, the frames and tongues of which are pivoted on the loops of the hooks engaging the said straps B, and the belly-band E, provided with the rings $m$ at its ends for engaging the hooked portion of the snap-hooks, substantially as herein shown and described.

WILLIE L. JOHNSON.

Witnesses:
W. M. MOSELEY,
J. C. WILBURN.